(12) United States Patent
Wolff (10) Patent No.: US 6,209,048 B1
(45) Date of Patent: *Mar. 27, 2001

(54) PERIPHERAL WITH INTEGRATED HTTP SERVER FOR REMOTE ACCESS USING URL'S

(75) Inventor: Gregory J. Wolff, Mountain View, CA (US)

(73) Assignees: Ricoh Company, Ltd., Tokyo (JP); Ricoh Corporation, Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/599,373

(22) Filed: Feb. 9, 1996

(51) Int. Cl.[7] .................................................. G06F 13/10
(52) U.S. Cl. ............................. 710/62; 710/65; 710/5; 709/203; 709/217; 707/501
(58) Field of Search ................ 395/200.33, 200.47, 395/200.48, 200.49; 709/203, 217, 218, 219; 710/62, 65, 5; 707/513, 501

(56) References Cited

U.S. PATENT DOCUMENTS 5,323,393 * 6/1994 Barrett et al. .......................... 370/449

OTHER PUBLICATIONS

Ken Goldberg et al. The Mercury Project "Beyond the Web; Excavating the Real World Via Mosiac" 1994: n. pag. Online. Internet. Available: http://www.usc.edu/dept/raiders/paper/, 1994.*

Ken Goldberg et al. "Tele-Garden", n. pag. Online. Internet. Available: http://telegarden.aec.at/, 1996.*

IBM TDB "Disk Drive with Embedded Hyper-Text Markup Language Server", v38 n12 12–95 p480, Dec. 1995*

Translation of Official Letter from the German Patent Office dated May 5, 1998, 4 pages.

Vetter, R.J., "Computer-controlled devices reach the Internet", In : Computer, Dec. 1995, pp. 66–67.

* cited by examiner

Primary Examiner—Dung C. Dinh
(74) Attorney, Agent, or Firm—Blakely, Sokoloff & Taylor & Zafman LLP (57) ABSTRACT

A peripheral control mechanism is described. The peripheral is operable with a network that provides access to interconnected, on-line documents. The access occurs in response to document requests. The peripheral includes a server that controls peripheral operations using requests formatted as a resource locator (e.g., an http request).

57 Claims, 5 Drawing Sheets

HTML SOURCE

```
<body>
<title> Peripheral Home Page </title>

<H1> Images </H1>
<a href – http://Camera1.ricoh.com/currentImage.gif>
    Current Image </a>
        •
        •
        •
<H1> Controls </H1>
<a href – http://Camera1.ricoh.com/mouseleft>
    Move Camera Left </a>
        •
        •
        •
</body>
```

PERIPHERAL WITH INTEGRATED HTTP SERVER FOR REMOTE ACCESS USING URL'S

FIELD OF THE INVENTION

The present invention relates to the field of peripheral devices used in conjunction with interconnected networks, such as the World Wide Web; more particularly, the present invention relates to directly controlling a peripheral via the existing protocols used to access documents on such a network.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide Web ("the Web") was introduced to the Internet. Early development of the Web took place at CERN, the European Particle Physics Laboratory. The Web is a wide-area hypermedia information retrieval system aimed to give wide access to a large universe of documents. At this time, the Web was known to and used by the academic/research community only. There was no easily available tool which allows a technically untrained person to access the Web.

In 1993, researchers at the National Center for Supercomputing Applications (NSCA) released a Web browser called "Mosiac" that implemented a graphical user interface (GUI). Mosiac's graphical user interface was simple to learn yet powerful. The Mosiac browser allows a user to retrieve documents from the Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "Hypertext Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

Portions of documents displayed on the Web contain hypertext links. The hypertext links link graphics or text on one document with another document on the Web. Documents containing hypertext links are created prior to their "publishing" on the Web. That is, a document that is to be published is provided to a server which creates the document and, essentially, publishes the document by permitting its access by others on the Web. Each hypertext link is associated with a Universal Resource Locator (URL) that identifies and locates a document on the Web. When a user selects a hypertext link, using, for instance, a cursor, the graphical browser retrieves the corresponding document(s) using a URL(s).

By removing the economic barriers associated with printing and distributing (multi-media) documents, the Web allows individuals to become "publishers". Many of these individuals are not information publishers, and, do not require high sophistication and complexity in publishing their information. To that extent, individuals utilizing the Web need to be able to create Web documents as well as retrieve information. Currently, tools for capturing images or other media do not perform the function seemlessly when attempting to integrate the captured information into Web documents. Any information captured must be converted into a hypertext document by a separate server.

Furthermore, because the Web represents a global standard for the exchange of documents, it may become the common currency in which companies and individuals publish both their external and internal documents. As the race to provide Internet (Web) services to every desktop and home continues, it is predictable that the number of "publishers" will continue to grow quickly. Similarly, the trend towards high quality, multi-media productions will continue to grow. Therefore, it is predictable that a great need for tools to create multi-media Web documents may exist. Many of these tools will be software applications, such as word processors.

Figure 1:
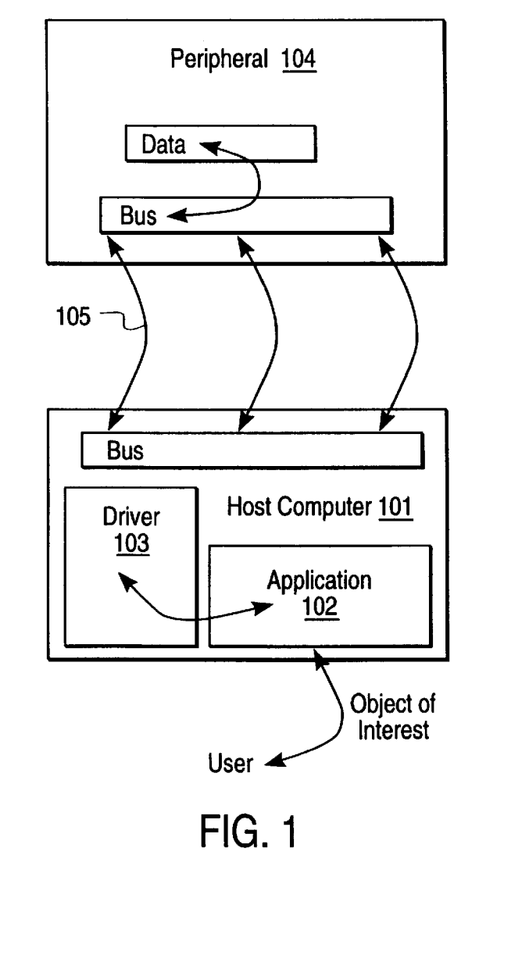
FIG. 1 is a prior art computer system with a host computer and a peripheral.

Peripheral devices are typically connected to the Web to facilitate user interaction with the Web. In prior art systems, peripheral devices are used for a variety of specific application functions. For instance, a printer, is used to print data, while a scanner is used to scan data. These peripherals are usually connected to a host computer, via a bus, which controls the use of the peripheral. A typical system is shown in FIG. 1. Referring to FIG. 1, a computer 101 typically includes an application 102 which makes calls to a driver 103 of peripheral 104 that is running on the host computer 101, thereby causing control information and signals to be sent over bus 105 to peripheral 104 to control its operation. Thus, access to peripheral is only through the host computer and its communication driver. Therefore, if an individual wishes to have the peripheral perform a specific function, the individual must communicate their wishes to the computer, which then causes the peripheral to perform the desired function. If an individual does not have access to a host computer with the proper driver, then the peripheral cannot be controlled. Moreover, if an individual is at a remote site, one may not have access to the host computer, yet would still like to control peripherals. Therefore, there is a need to be able to control peripherals directly, without relying on a host as an interface. Furthermore, it is desirable to allow the same control from a remote location.

Currently, information cannot be captured and made accessible automatically as a Web document, i.e. by specifying a URL. Moreover, there are currently no tools which permit any of the capturing and conversion process to be performed from a remote location. Also, what is needed is a way to capture information that can be made accessible automatically as a Web document, such as by specifying a URL. Also needed is a way to control the capture of information from a remote location.

SUMMARY OF THE INVENTION

A peripheral control mechanism is described. The peripheral is operable with a network that provides access to interconnected, on-line documents. The access occurs in response to document requests. The peripheral includes a server that controls peripheral operations using requests formatted as a resource locator (e.g., an http request).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments.

DETAILED DESCRIPTION OF THE PRESENT INVENTION

A method and apparatus for creating electronic documents and controlling peripherals is described. In the following detailed description of the present invention numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Overview of the Present Invention

The present invention provides peripherals that are coupled to a network and are able to respond to requests from the network. In one embodiment, the requests are associated with the World Wide Web (the WWW). In the present invention, peripherals act as WWW servers. That is, peripherals are directly coupled to a local area network (LAN) or wide area network (WAN) and "serve" data, such as images or other multi-media objects, that they capture or create to requesting agents on the network.

In one embodiment of the present invention, the peripheral uses a hypertext transfer protocol ("HTTP") to communicate over the network with clients; such clients also communicate with the peripheral using the hypertext transfer protocol. This peripheral and these clients act as an HTTP server and HTTP clients respectively.

In one embodiment, the peripheral includes a processor and a memory and a computer readable medium, such as a magnetic ("hardisk") or optical mass storage device, and the computer readable medium of the peripheral contains computer program instructions for transmitting the data from the peripheral to the clients systems. The clients in the system will typically include a client processor and a memory and a computer readable medium, such as a magnetic or optical mass storage device, and the computer readable medium of the client contains computer program instructions for receiving data from the peripheral and for storing the data at the client.

Overview of Client-Server Operation

The following is a brief explanation regarding client-server operation, URL's and browsing of the Web.

Conceptually, a computer network, such as the Internet, includes small computers and large computers, commonly used as servers. In general, small computers are "personal computers" or workstations and are the sites at which a human user operates the computer to make requests for data from other computers or servers on the network. Usually, the requested data resides in large computers. In this scenario, small computers are clients and the large computers are servers. In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client or server, or vice versa.

The WorldWideWeb ("Web") uses the client-server model to communicate information between clients and servers. Web servers are coupled to the Internet and respond to document requests from Web clients. Web clients (e.g., Web "browsers") are programs that allow a user to simply access Web documents located on Web servers.

An example of a client-server system interconnected through the Internet may include a remote server system is interconnected through the Internet to a client system. The client system may include conventional components such as a processor, a memory (e.g., RAM), a bus which coupled the processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem. It will be appreciated from the description below that the present invention may be implemented in software which is stored as executable instructions on a computer readable medium on the client and server systems, such as mass storage devices respectively, or in memories respectively.

To define the addresses of resources on the Internet, Uniform Resource Locator (URL) system are used. A URL is a descriptor that specifically defines a type of Internet resource and its location. URLs have the following format:

resource_type://domain.address/path_name

Where "resource_type" defines the type of internet resource. Web documents are identified by the resource type "http" which indicates that the hypertext transfer protocol should be used to access the document. Other resource types include "ftp" (file transmission protocol) and "telnet". The "domain.address" defines the domain name address of the computer that the resource is located on. Finally, the "path_name" defines a directory path within the file system of the server that identifies the resource. The right most name on the path name portion is usually the name of an actual file. Web pages are identified by the resource type "http". By convention, most Web pages end with the suffix ".htm1" that suggests the file is a HyperText Markup Language document.

An example of a URL for a Web document is:

http://info.tech.ch/hypertext/Data/WWW/History.htm1

This URL indicates that by using the HTTP (Web) protocol to reach a server called "info.tech.ch", there is a directory "hypertext/Data/WWW" that contains a hypertext document named "History.htm1." Resources on the Internet are uniquely addressable by their URL.

To access an initial Web document, the user enters the URL for a Web document into a Web browser program. The Web browser then sends an http request to the server that has the Web document using the URL. The Web server responds to the http request by sending the requested HTTP object to the client. In most cases, the HTTP object is an plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can selected the hyperlink.

The present invention is generally advantageous in that as a peripheral acts as a Web server, it does not need to interact directly with any particular "host".

Peripheral of the Present Invention

Figure 2:
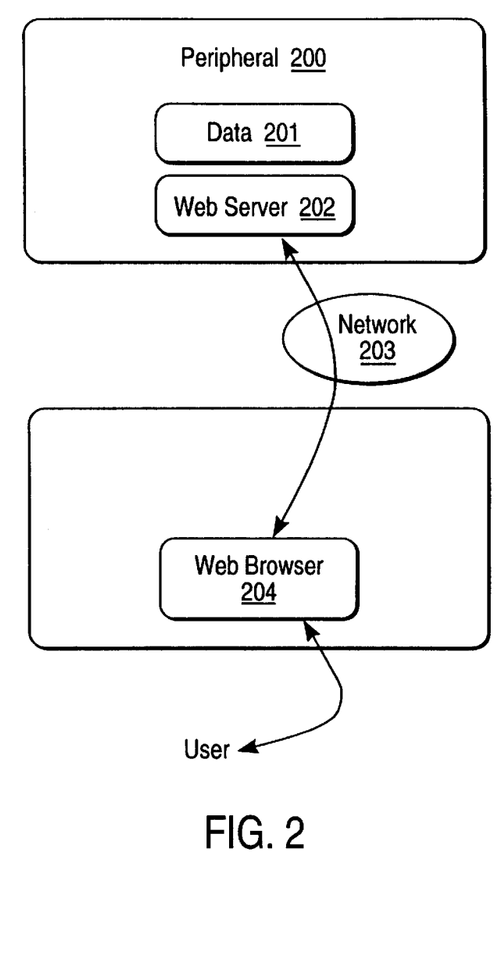
FIG. 2 is a block diagram of the system of the present invention.

FIG. 2 illustrates a peripheral of the present invention. Referring to FIG. 2, peripheral 200 of the present invention is shown with data 201 and Web server 202. Web server 202 accesses data 201 and supplies data 201 over network 203 to a user in response to requests from the user via Web browser 204. Data 201 may be accessed from a memory in or associated with peripheral 200, or may be obtained by peripheral 200 performing one of its predefined functions (e.g., a camera peripheral capturing an image).

In one embodiment, network 203 comprises the Internet. The present invention is not limited to retrieving and publishing documents on the "World Wide Web" or the "Internet." The teachings of the present invention may be applied to various networks, data and document storage and archival facilities, or other types of client/server systems which have documents or other information available upon request.

In one embodiment, the peripheral is coupled via a channel to a Web site in the WWW. The peripheral may comprise the Web site and the Web site is coupled to the Internet or other network or document resource which provides access to the WWW. Communications over network 203 are accomplished through these protocols over a LAN (or WAN), thus obviating the need for special "driver" software running on a host computer to direct the peripheral.

In the present invention, peripherals, such as a digital still video camera, create Web documents by capturing images and other media and seeminglessly integrating them with Web documents. The data captured and/or generated by the peripherals, whether it be images, text, sounds, video, etc., is automatically available on the WWW and may be easily incorporated into user's Web documents. To that extent, the present invention allows the user to easily create and manipulate hypertext links (URLs). The protocols (http) for Web servers and clients are public and well-known.

Note that for the purposes of the present invention, web documents are distributed objects. A source document may reference many other objects of disparate types for inclusion into a single "page". Thus, an author need only reference an image, or other data, in order to include it in a document. In one embodiment, the reference comprises a URL specified by the author. The image (or other data) need not exist on his personal machine; it simply needs to be accessible by the reader when they read the document. If a URL is specified by their author, the URL needs to be accessible to the reader's machine. The seamless integration of the present invention refers to the author, in conjunction with a server tool, simply inserting a reference to data or an image in his source document. When a reader views the document, the peripheral of the present invention itself is contacted in order to retrieve the referenced information. If the information comprises an image, this image might be a static image (previously captured and stored to mass storage on the peripheral) or a "live" image (captured new each time it is requested).

In order to access the peripheral via the WWW, users may specify a URL. A peripheral may be responsive to multiple URLs, and provide different information or perform different tasks in response to each URL. In one embodiment, users may also use "forms" for accomplishing various tasks. A user can fill-in blanks, mark boxes, or perform any other selection technique that the form affords. The selections may specify requested information or may specify command selections. The form generates a URL that embodies the request. The selections, as a URL, are then sent to the peripheral which takes the appropriate action.

Although the present invention attempts to provide a common interface to all peripherals, the interfaces differ substantially to those of the prior art. For instance, the present invention provides a single interface that is easily customized by new HTML pages for each user/location. The present invention is a global standard for document exchange. No driver software is required; therefore, the control function is easier to develop. Additionally, the present invention maintains objects and serves them all over the Web, while allowing remote access to a peripheral without the need of a host.

The present invention allows peripherals to create objects which can be directly displayed on Web clients and be incorporated in Web documents. In other words, the information content may be directly transferred from information access (capture) to display (of a requested text, image, etc.). Note that Web aware peripherals to easily coexist with unaware peripherals.

One Embodiment of The Peripheral of the Present Invention

In the present invention, each peripheral includes a web server and a communication mechanism to allow the peripheral to communicate with the network. As a web server, the peripheral communicates with network 203 and handles http requests. Although peripheral 200 is shown having a Web server 202, the server need not be a full http server. In one embodiment, Web server 202 need only be software that handles those types of requests described herein.

In one embodiment, the peripheral includes a communications port, such as a wireless modem. Note that the peripheral of the present invention may employ one or more communications mechanisms. Peripheral 200 may comprise software/hardware for communicating with a WAN such as a telephone interface with an RJ-11 jack.

When the peripheral is on, it attempts to communicate with the remainder of the network (e.g., Internet). When communication is achieved with the network, the peripheral registers that it is active. In one embodiment, each peripheral uses an identifier (e.g., name) to register. The name may be assigned by a central location (e.g., corporate headquarters)

or may be customized by, for instance, running a setup routine that sets the domain name or address. The identifier must be known and propagated to routers and the infrastructure of the WAN so that when a request is sent to this particular peripheral, the routers know how to transfer it.

Once connected to the network, peripheral 200 monitors the communication link for document requests. The peripheral has translation software that interprets the request or URL into control parameters that control the peripheral. Thus, the peripheral internally issues commands to perform any requested actions. Peripheral 200 handles requests by sending text and images in a format that is well-known in the art or by performing one or more requested functions.

Figure 3A:
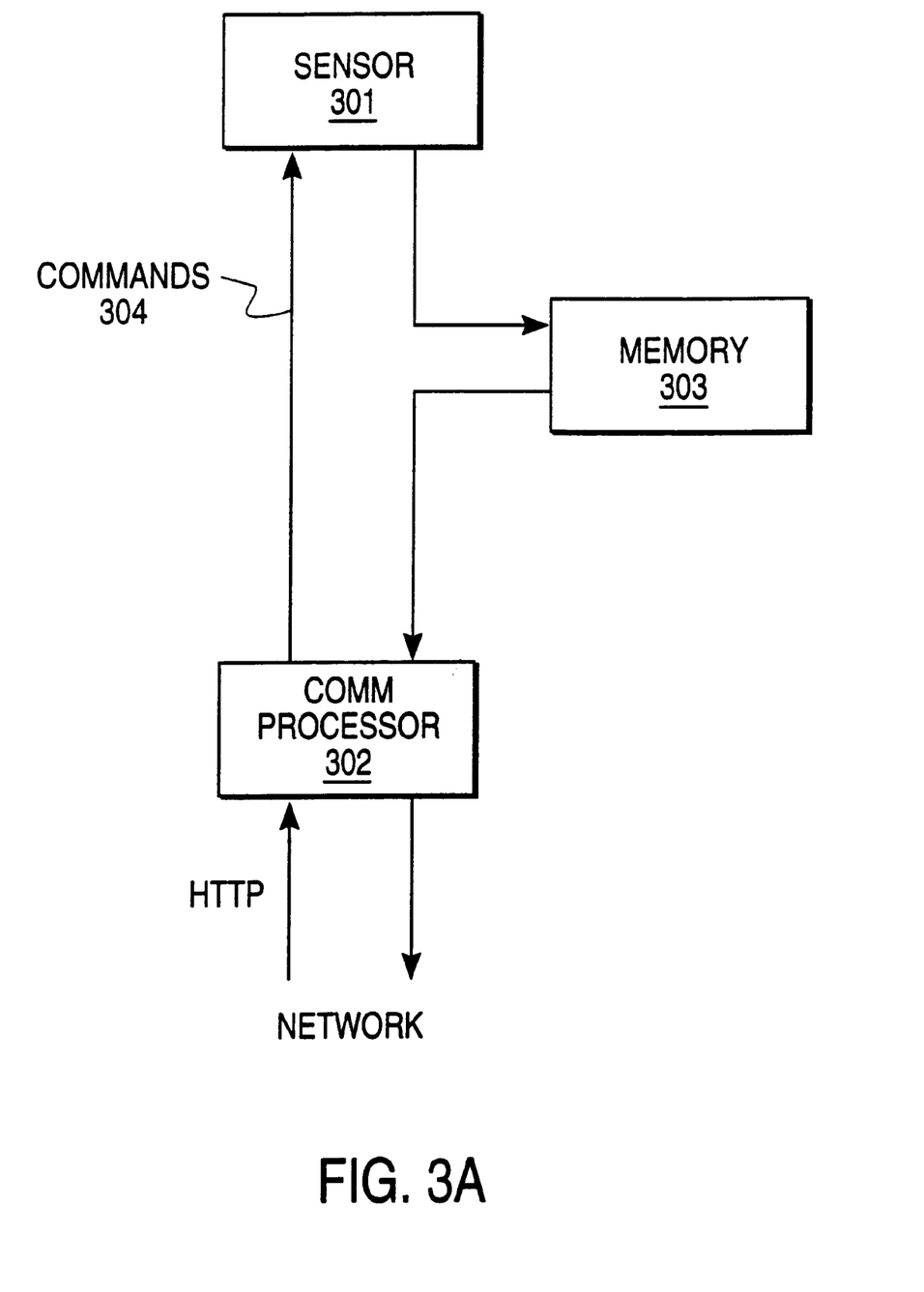
FIG. 3A is a block diagram of one embodiment of the peripheral of the present invention.

One embodiment of the peripheral of the present invention is shown in FIG. 3A. Referring to FIG. 3A, peripheral 300 comprises sensor 301, a processor 302 coupled to sensor 301 and a memory 303 coupled to both sensor 301 and processor 302. Each of these components may be coupled together using one or more conductors. Operating according to software, processor 302 receives http requests from the network (WWW) and translates those requests into commands, which are forwarded to sensor 301.

In response to the commands, sensor 301 performs a function as designated by the commands. Sensor 301 may comprise any device, component, mechanism, etc. being a part of peripheral 300 that acquires information through sensing. In one embodiment, sensor 301 comprises the image capturing mechanism of a camera (e.g., digital camera).

The information sensed by sensor 301 is stored in memory 303. Memory 303 may comprise a buffer memory. In one embodiment, memory 303 is external to peripheral 300 or includes a portion which is external to peripheral 300. The stored information is obtained by processor 302 and forwarded to the requester.

Figure 3B:
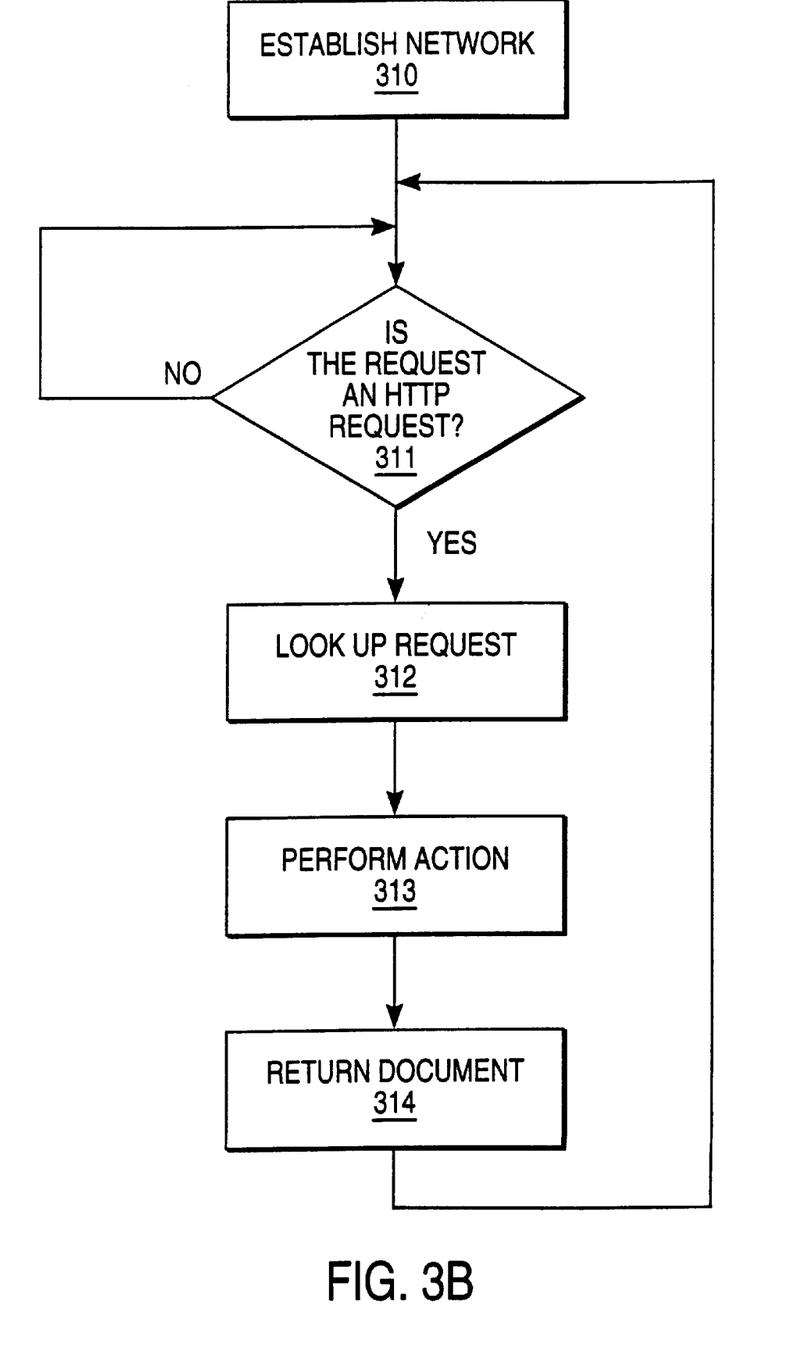
FIG. 3B is a flow chart of the operation of one embodiment of the processing logic in the peripheral of the present invention.

FIG. 3B is a flow diagram of the operation of the operation of the peripheral. Referring to FIG. 3B, the processor initially establishes a network link (processing block 310). Establishing such a link is well-known in the art. Once communication between the peripheral and the network has been established, the processor tests whether an incoming communication is an http request (processing block 311). If not, the processor repeats the test, typically within a predetermined time interval. If the processor determines that an incoming communication is an http request, the processor looks up (e.g., decodes) the request (processing block 312) and the action is performed (processing block 313). Performing the action may comprise the processor sending commands (e.g., signals) to the sensor, causing the sensor to perform the action (e.g., capture image, move, shut off, power on, close, open, etc.). Alternatively, performing the action may comprise generating commands/signals causing information to be accessed from memory.

Lastly, after performing the action, the process of the present invention may optionally include returning a document and/or image to the requester (processing block 314).

In one embodiment, peripheral 200 is also able to accept "live" information. The information (e.g., image, text, data, etc.) that is currently being sensed may be made available as a document accessible by other users coupled to the network. For instance, in the case of a camera, images of the location being reviewed may be made available as documents (or as a part of a document(s)). The information being provided may be formated in a predetermined manner (e.g., in accordance with the http protocols). For instance, a document(s) provided may include pointers or links to other related information (e.g., temporally related, content related, etc.).

In one embodiment, the peripheral of the present invention can upload information to a central site which serves as a proxy for the peripheral. The central site may have a faster communications link and can handle requests for the peripheral when the peripheral is not available. This also makes registration easier since the peripheral needs to establish communication with the central site, with the routes between the central site and the WWW being static. In this manner, the WWW does not have to be updated to route information to the peripheral.

The peripheral is accessed through a web browser. The peripheral essentially has a home page that may include the control parameters, pointers to current or archived images, and pointers to documents and information stored at another location.

Figure 4A:
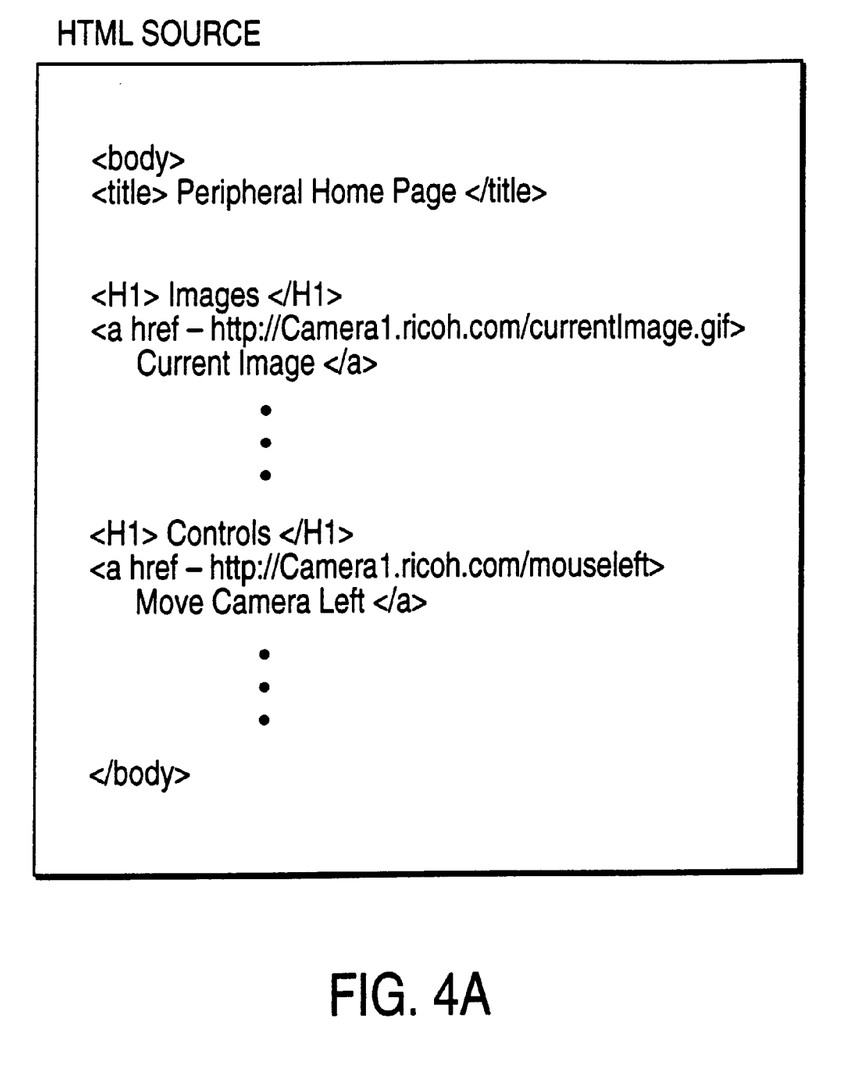
FIG. 4A is an example of an HTML document.

FIG. 4A illustrates an example of an HTML document. FIG. 4A is an example of the html source code and the associated URLs for accessing various functions of a peripheral. In this example, the peripheral is a camera. Referring to FIG. 4A, the second line of the document in FIG. 4A reads "<title> Peripheral Home Page</title>." In this case, the tags <title> and </title> are HTML delimiters corresponding to the beginning and ending, respectively, of text that is designated as the title of the HTML document. The title could be used for various purposes, such as listing of the document in an automatically generated index.

The third line of the HTML document of FIG. 4A reads "<h1> Images </h1>" The <h1> and </h1> are HTML delimiters for a header that is to be displayed in a largest font. The browser software running on the client computer interprets the header tags and thus displays the text between the header tags in a largest font size on the client's display screen.

Figure 4B:
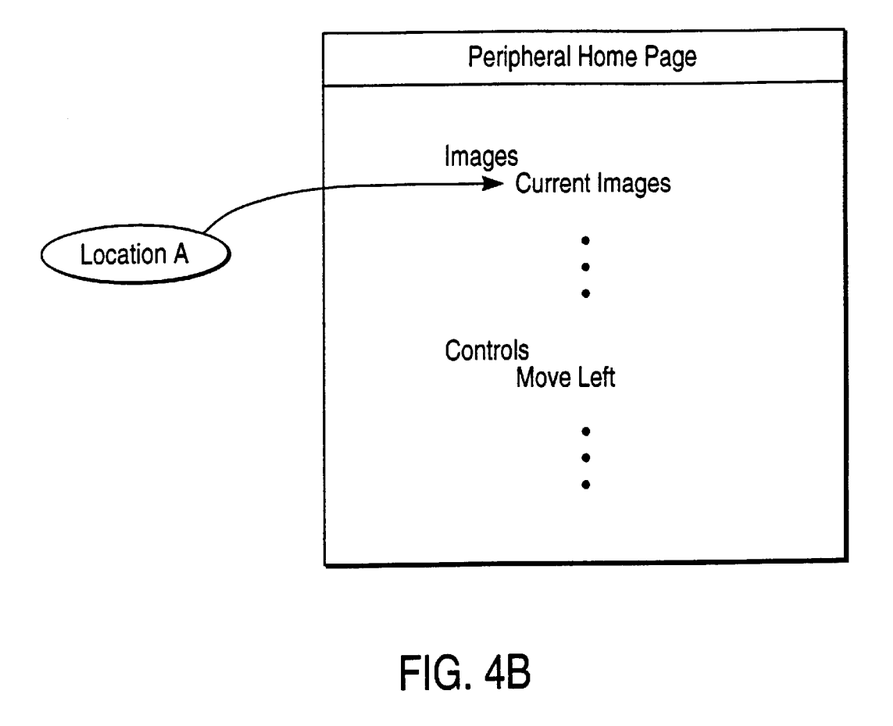
FIG. 4B is an example home page for the HTML document of FIG. 4A.

The next line continues with the phrase "from the <a href="http://Camera1.ricoh.com/CurrentImage.gif>Current Image</a>. This phrase defines "CurrentImage" as a link to obtain the current image. Specifically, the "a" tag defines the beginning of a link. The "href=" tag defines that the link is to a Web page that can be located using the URL "http://Camera1.ricoh.com/CurrentImage.gif". Next, the text "Current Image" is the document that will be the link. Finally, the "/a" tag defines the end of the link definition. As illustrated in FIG. 4B, the text "Current Image" is displayed with underlining that indicates it is a link to another document. If the user selects the underlined text "Current Image", then the browser will send out a http request for the Web page at the URL address "http://Camera1.ricoh.com/CurrentImage.gif". Thus, two URLs are shown, one for capturing the current image and the other for moving the camera to the left. Different URLs may specify different distances and/or angles to move the camera.

FIG. 4B illustrates an example of a home (Web) page for the peripheral in a Web browser that enables a user to access, or control, the peripheral. By performing a "point-and-link" operation at location A in FIG. 4B, a URL request is sent to the camera. Upon receipt, the camera translates the request for CurrentImage.gif into a command to capture an image and send it back to the requester in gif format.

It can be seen from the above example that the HTML document contains all information a browser needs for displaying a Web page. Thus, the only responsibility of a Web server is to provide the requested document or function, and there is no need for the server to request a client to do anything else. However, this role of a server also limits the utility of the Web environment.

Requests to peripheral 200 may comprise arbitrary commands. In one embodiment, peripheral 200 includes a form for use in setting up particular parameters controlling the operation of the peripheral. For instance, the parameters might relate to setting up the direction of view of a camera, with entries corresponding to camera angle. The form may be filled out by using the web browser and sent back to the camera. In response to the filled-in form, the server in the peripheral receives a (e.g., a URL) string requesting the document. The server responds to the request by moving the camera. Note that any command that the peripheral can execute may be controlled in this way by a user anywhere on the network.

In one embodiment, access to the peripherals requires a password or some other security precaution. Such security features are being built into emerging HTTP standards.

Peripheral Applications of the Present Invention

The present invention may be applied to a variety of peripheral devices. For instance, the present invention may be applied to digital cameras, multi-function machines, scanners (particularly those with on-board archiving memory), copiers with archiving memory, microphones, remote video camera, and to controlling the printing of a copier (double sided printing).

The present invention may be applied to security cameras, such as would be mounted in a user's home and plugged into a local network (e.g., telephone network). In one embodiment, each such camera has its own URL and the ability to serve documents to the Web. The user may, from any location, connect to the Internet and view pictures from this camera via any Web browser, simply by clicking on the appropriate links. Furthermore, the server of the camera of the present invention might include forms which allow the user to adjust the operation, or view archived photos, simply by clicking on appropriate items. In this case, the URLs on the form link to objects stored in a memory of the camera or a memory accessible by the web server associated with the camera.

The present invention may be applied to a report camera which an individual (e.g, reporter) carries around to obtain "snap-shots" of the field. Each shot could be available for immediate use as soon as the camera is connected to a network or is in communication with the network.

The present invention also applies to a multi-function machine like a scanner that includes storage and retrieval of documents both in source and image form. In one embodiment, this machine includes logs of document transactions and may be allowed to be queried to see the number of particular documents that have been made and where they have been sent.

The present invention may be applied to a facsimile machine also that functions as an external publishing machine. In one embodiment, clients obtain information either from the WWW or via the facsimile machine itself. In the case of facsimile machine, documents are stored in memory by the machine and communicates with the Internet or directly with other facsimile machines. The request for a document is sent out via G3 for facsimile to facsimile transmission or via http for facsimile to WWW transmission.

The present invention may be applicable to a digital visual camera, such as one that serves MPEG movies along with still video images and indexes.

The present invention may be applied to a printer that may print Web documents in whatever format is appropriate. In such a case, the printer may maintain compatibility with the multiple different formats and be controlled to do the same.

The present invention may also be applied to Web Kiosks which are stand alone machines that allow a user to browse the WWW and also create some information on their own.

One of the advantages of the present invention is ease of customization. The documents that control the peripheral may be created on a totally separate server, completely separate from the Web server of the peripheral. That is, under the present invention, customization may comprise a locally developed "page" which points to resources on the peripheral. Thus, the present invention is not dependent on any one company or operating system. Each document includes pointers (e.g., links) to the accessible pages on the peripheral. In other words, on one server a document may be created that contains links, which may be selected, such a clicking on one of the links with a web browser, causing a document to be retrieved from the peripheral. Therefore, by inserting the appropriate universal resource locators (URLs) at desired locations in a document. A completely customized interface may be created completely separate from the peripheral itself.

The customization of the present invention allows specifying the latest document "captured" by the peripheral, or even causes the capturing of the document itself. This type of control of the peripheral may be extended to cause the peripheral to perform any of its functions, thereby allowing its direct control from remote locations using customized interfaces.

Another advantage of the present invention is that the driver for the periperal is standard such that a host computer to drive the peripherals would not be needed. All of the functionality provided by the host computer is contained in the peripheral, including server software. In this manner, all accesses are made via a common web interface. This saves cost in that separate drivers to support different operating systems and computer systems are not required.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for controlling a peripheral has been described.

I claim:

1. A peripheral for use with a network providing access to interconnected, on-line documents in response to document requests, said peripheral comprising:

a server to control peripheral operations of said peripheral directly in response to requests, each of the requests formatted as http document requests, such that the peripheral can be coupled directly to said network.

2. The peripheral defined in claim 1 wherein the server is also responsive to request forms.

3. The peripheral defined in claim 2 wherein the request forms are fill-in through the use of a graphical browser.

4. The peripheral defined in claim 1 further comprising a data source, wherein the server provides data from the data source in response to requests.

5. The peripheral defined in claim 4 wherein the server controls the data source to capture information in response to an individual specifying a uniform resource locator, said server supplying the captured information.

6. A single integrated peripheral device that may be coupled directly to a network, said device comprising:

a functional unit to perform a plurality of operations, each of the plurality of operations being invoked by a user specifying a descriptor defining a resource and its location, such that the single peripheral is responsive to a plurality of requests to control its operation;

a communications mechanism that may be coupled to the network to transfer information to and from the device, wherein the communications mechanism receives requests for the device;

a server coupled to the communications mechanism and the functional unit to translate the requests into parameters so that the functional unit is controlled directly by the requests and the device can be coupled directly to the network.

7. The device defined in claim 6 further comprising storage coupled to the server and the communications mechanism to store objects that the server provides to the network using the communications mechanism in response to the descriptors from the network.

8. The device defined in claim 7 wherein the objects comprise at least one html source document.

9. The device defined in claim 6 further comprising registration means for registering the device with the network.

10. The device defined in claim 9 wherein the device is assigned an identifier for use in registration.

11. The device defined in claim 10 wherein the identifier comprises an IP number and name.

12. The device defined in claim 6 wherein the requests comprise at least one http request.

13. The device defined in claim 6 wherein the network comprises a local area network.

14. The device defined in claim 6 wherein the network comprises a wide area network.

15. The device defined in claim 6 wherein the commucations mecahnism transfers information between the device and at least one phone line.

16. The device defined in claim 6 wherein the communications mechanism transfers information between the device and an ISDN.

17. The device defined in claim 6 wherein the server comprises an http server.

18. The device defined in claim 6 wherein the functional unit is directly controlled by a URL.

19. A system comprising:

a network;

a single integrated peripheral coupled to the network that performs operations, said peripheral comprising a communications mechanism to transfer information to and from the peripheral, wherein the communications mechanism receives requests for the device;

a server coupled to the communications mechanism to handle a plurality of requests, each of the requests being invoked by a user specifying a resource identifier defining a resource and its location, such that the peripheral is controlled via a plurality of resource identifiers, wherein the server translates at least one of said plurality of requests into at least one parameter, peripheral functionality is directly controlled by the requests, and the peripheral can be coupled directly to the network; and a device coupled to the network, wherein a user of the device selects one of the resource identifiers to access the peripheral, such that the device controls the peripheral directly by selecting the resource identifier via an object being viewed by a user of the device.

20. The system defined in claim 19 wherein the resource identifier comprises a universal resource locator (URL).

21. The system defined in claim 19 wherein the peripheral comprises an I/O device.

22. The system defined in claim 21 wherein the I/O device comprises a camera.

23. The system defined in claim 21 wherein the peripheral device comprises a multi-function machine.

24. A method of controlling a peripheral coupled to a network with a device coupled to the network, said method comprising:

the device selecting one of a plurality of resource identifiers to select one of a plurality of operations to be performed by the peripheral, each of the plurality of operations being invoked individually by a user specifying a descriptor defining a resource and its location, such that the peripheral is responsive to a plurality of descriptors to control its operation;

generating a request to the peripheral in response to the one resource identifier being selected; and directly controlling the peripheral by the one resource identifier, wherein the request is handled using a server on the peripheral.

25. The method defined in claim 24 wherein directly controlling the peripheral comprises contacting the peripheral directly to retrieve a document.

26. The method defined in claim 25 wherein the document comprises a previously created document stored in the peripheral.

27. The method defined in claim 25 wherein the document comprises data captured automatically in response to the peripheral receiving the request.

28. The method defined in claim 24 wherein directly controlling the peripheral comprises translating the request into at least one control parameter that causes the peripheral to operated in a predetermined manner.

29. The method defined in claim 24 wherein directly controlling the peripheral comprises handling the request using a server on the peripheral.

30. The method defined in claim 24 further comprising creating an interface for use on the device, wherein the interface includes the resource identifier specifiable by a user.

31. The method defined in claim 24 wherein further comprising interacting with an interface displayed on the device.

32. The method defined in claim 31 wherein the interface comprises a form originating from the peripheral.

33. A peripheral for use with a network providing access to interconnected, on-line documents in response to document requests, said peripheral comprising:

a server to control peripheral operations of the peripheral directly in response to requests by translating the requests into commands, each of the requests formatted as a http document request such that the peripheral can be coupled directly to said network; and a memory to maintain objects that the server serves onto the network in response to requests.

34. The peripheral defined in claim 33 wherein the server is also responsive to request forms.

35. The peripheral defined in claim 34 wherein the request forms are fill-in through the use of a graphical browser.

36. The peripheral defined in claim 33 further comprising a data source, wherein the server provides data from the data source in response to requests.

37. The peripheral defined in claim 36 wherein the server controls the data source to capture information in response to an individual specifying a uniform resource locator, said server supplying the captured information.

38. A single integrated peripheral device that may be coupled directly to a network, said device comprising:

a functional unit to perform a plurality of operations, each of the plurality of operations being invoked by a user specifying a descriptor defining a resource and its location, such that the single peripheral is responsive to a plurality of requests to control its operation;

a communications mechanism that may be coupled to the network to transfer information to and from the device, wherein the communications mechanism receives requests for the device;

a server coupled to the communications mechanism and the functional unit to translate the requests into parameters so that the functional unit is controlled directly by the requests and the device can be coupled directly to the network; and a storage coupled to the server and the communications mechanism to store objects that the server provides to the network using the communications mechanism in response to requests, such that the peripheral is responsive to a plurality of requests that individually specify objects to be served by the server that are maintained in the storage.

39. The device defined in claim 38 further comprising registration means for registering the device with the network.

40. The device defined in claim 39 wherein the device is assigned an identifier for use in registration.

41. The device defined in claim 40 wherein the identifier comprises an IP number and name.

42. The device defined in claim 38 wherein the requests comprise at least one http request.

43. The device defined in claim 38 wherein the network comprises a local area network.

44. The device defined in claim 38 wherein the network comprises a wide area network.

45. The device defined in claim 38 wherein the communications mechanism transfers information between the device and at least one phone line.

46. The device defined in claim 38 wherein the communications mechanism transfers information between the device and an ISDN.

47. The device defined in claim 38 wherein the server comprises an http server.

48. The device defined in claim 38 wherein the functional unit is directly controlled by a URL.

49. A method of controlling a peripheral coupled to a network with a device coupled to the network, the method comprising:

the peripheral receiving a request relating to a resource identifier selecting one of a plurality of operations to be performed by the peripheral, each of the plurality of operations being invoked individually by a user specifying a descriptor defining a resource and it s location, such that the peripheral is responsive to a plurality of descriptors to control its operation; and directly controlling the peripheral by the one resource identifier, wherein the request is handled using a server on the peripheral which converts the request into at least one command.

50. The method defined in claim 49 wherein directly controlling the peripheral comprises contacting the peripheral directly to retrieve a document.

51. The method defined in claim 50 wherein the document comprises a previously created document stored in the peripheral.

52. The method defined in claim 50 wherein the document comprises data captured automatically in response to the peripheral receiving the request.

53. The method defined in claim 49 wherein directly controlling the peripheral comprises translating the request into at least one control parameter that causes the peripheral to operate in a predetermined manner.

54. The method defined in claim 49 wherein directly controlling the peripheral comprises handling the request using a server on the peripheral.

55. The method defined in claim 49 further comprising creating an interface for use on the device, wherein the interface includes the resource identifier specifiable by a user.

56. The method defined in claim 49 wherein further comprising interacting with an interface displayed on the device.

57. The method defined in claim 56 wherein the interface comprises a form originating from the peripheral.

* * * * *